(12) United States Patent
Still et al.

(10) Patent No.: US 7,166,560 B2
(45) Date of Patent: *Jan. 23, 2007

(54) GENERATING ACID DOWNHOLE IN ACID FRACTURING

(75) Inventors: John W. Still, Richmond, TX (US); Keith Dismuke, Katy, TX (US); Wayne W. Frenier, Katy, TX (US)

(73) Assignee: Schlumberger Technology Corporation, Sugarland, TX (US)

( * ) Notice: Subject to any disclaimer, the term of this patent is extended or adjusted under 35 U.S.C. 154(b) by 203 days.

This patent is subject to a terminal disclaimer.

(21) Appl. No.: 10/605,784

(22) Filed: Oct. 27, 2003

(65) Prior Publication Data

US 2004/0152601 A1 Aug. 5, 2004

Related U.S. Application Data

(60) Provisional application No. 60/421,696, filed on Oct. 28, 2002.

(51) Int. Cl.
*C09K 8/68* (2006.01)
*C09K 8/72* (2006.01)
*C09K 8/74* (2006.01)

(52) U.S. Cl. .......... 507/219; 507/203; 507/923; 507/933; 166/308.1; 166/308.3

(58) Field of Classification Search ............... None
See application file for complete search history.

(56) References Cited

U.S. PATENT DOCUMENTS

| | | | | |
|---|---|---|---|---|
| 3,630,285 | A | 12/1971 | Claytor et al. ............... 166/300 |
| 4,122,896 | A | 10/1978 | Scheuerman et al. ........ 166/250 |
| 4,716,964 | A * | 1/1988 | Erbstoesser et al. ......... 166/284 |
| 4,848,467 | A | 7/1989 | Cantu et al. ................. 166/281 |
| 4,957,165 | A | 9/1990 | Cantu et al. ................. 166/295 |
| 4,961,466 | A | 10/1990 | Himes et al. ................ 166/250 |
| 4,986,354 | A * | 1/1991 | Cantu et al. ................. 166/279 |
| 4,986,355 | A | 1/1991 | Casad et al. ................. 166/295 |
| 5,325,921 | A * | 7/1994 | Johnson et al. ........... 166/280.1 |
| 5,439,057 | A * | 8/1995 | Weaver et al. ............... 166/295 |
| 5,680,900 | A * | 10/1997 | Nguyen et al. .............. 166/295 |
| 6,207,620 | B1 | 3/2001 | Gonzalez et al. ............ 507/277 |
| 6,432,885 | B1 | 8/2002 | Vollmer ....................... 507/236 |
| 6,506,873 | B1 * | 1/2003 | Ryan et al. .................. 528/354 |
| 6,509,301 | B1 * | 1/2003 | Vollmer ....................... 507/236 |
| 6,599,863 | B1 | 7/2003 | Palmer et al. ............... 507/219 |
| 6,817,414 | B2 * | 11/2004 | Lee ............................. 166/278 |
| 6,818,594 | B1 * | 11/2004 | Freeman et al. ............. 507/101 |
| 2003/0060374 | A1 * | 3/2003 | Cooke ......................... 507/200 |
| 2006/0054325 | A1 * | 3/2006 | Brown et al. ............. 166/308.2 |
| 2006/0058197 | A1 * | 3/2006 | Brown et al. ................ 507/103 |

FOREIGN PATENT DOCUMENTS

EP 0401431 12/1990

OTHER PUBLICATIONS

U.S. Appl. No. 60/325,071, filed Sep. 26, 2001.*
SPE 7892—*Higher pH Acid Stimulation Systems* by Charles C. Templeton, E.A. Richardson, and Ronald F. Scheuerman.

* cited by examiner

*Primary Examiner*—David J. Buttner
(74) *Attorney, Agent, or Firm*—Thomas O. Mitchell; Tim Curington; Robin Nava

(57) ABSTRACT

An acid fracturing method is provided in which the acid is generated in the fracture by hydrolysis of a solid acid-precursor selected from one or more than one of lactide, glycolide, polylactic acid, polyglycolic acid, a copolymer of polylactic acid and polyglycolic acid, a copolymer of glycolic acid with other hydroxy-, carboxylic acid-, or hydroxy-carboxylic acid-containing moieties, and a copolymer of lactic acid with other hydroxy-, carboxylic acid or hydroxy-carboxylic acid-containing moieties. The solid acid-precursor may be mixed with a solid acid-reactive material to accelerate the hydrolysis and/or coated to slow the hydrolysis. Water-soluble liquid compounds are also given that accelerate the hydrolysis. The method ensures that the acid contacts fracture faces far from the wellbore.

17 Claims, 1 Drawing Sheet

GENERATING ACID DOWNHOLE IN ACID FRACTURING

CROSS REFERENCE TO RELATED APPLICATIONS

This application claims the benefit of U.S. Provisional patent application No. 60/421,696, filed on Oct. 28, 2002.

BACKGROUND OF INVENTION

This invention relates to a method of injecting solid acid-precursors that dissolve in water to generate acids after they have been injected. More particularly it relates to a method of generating acids in situ far from the wellborein fractures in acid fracturing (fracture acidizing).

In acid fracturing, acid is placed in the fracture, at a distance from the wellbore, where it reacts with the face of the fracture to etch differential flow paths that a) create disparities so that the opposing fracture faces do not match up when the fracture pressure is released and so the fracture does not close completely, and b) provide flow paths for produced fluid along the fracture faces from distant portions of the fracture toward the wellbore. Normally, the acid is placed in the desired location by forming an acidic fluid on the surface and pumping the acidic fluid from the surface and down the wellbore above fracture pressure. There are generally two major problems encountered during this normal procedure.

First, in the pumping operation the acid is in contact with iron-containing components of the wellbore such as casing, liner, coiled tubing, etc. Acids are corrosive to such materials, especially at high temperature. This means that corrosion inhibitors must be added to the fluid being injected in order not to limit the amount of acid, and/or the time of exposure, that can be used during injection of an acid. Furthermore, acid corrosion creates iron compounds such as iron chlorides. These iron compounds may precipitate, especially if sulfur or sulfides are present, and may interfere with the stability or effectiveness of other components of the fluid, thus requiring addition of iron control agents or iron sequestering agents to the fluid.

Second, if, as is usually the case, the intention is to use the acid to treat a part of the formation at a significant distance away from the wellbore, this may be very difficult to accomplish because if an acid is injected from the surface down a wellbore and into contact with the formation, the acid will naturally react with the first reactive material with which it comes into contact. Depending upon the nature of the well and the nature of the treatment, this first-contacted and/or first-reacted material may be a filter-cake, may be the formation surface forming the wall of an uncased (or openhole) wellbore, may be the near-wellbore formation, or may be a portion of the formation that has the highest permeability to the fluid, or is in fluid contact with a portion of the formation that has the highest permeability to the fluid. In many cases, this may not be the formation (matrix) material with which the operator wants the acid to react. At best this may be wasteful of acid; at worst this may make the treatment ineffective or even harmful. In general, the higher the temperature the more reactive is the acid and the greater are the problems.

There are several ways in which operators have dealt with these problems in the past. One method is to segregate the acid from the material with which reaction is not desired. This is done, for example, by a) placing the acid in the internal phase of an emulsion (so-called "emulsified acid") and then either causing or allowing the emulsion to invert at the time and place where reaction is desired or allowing slow transport of the acid across the phase boundaries, or b) encapsulating the acid, for example by the method described in U.S. Pat. No. 6,207,620, and then releasing the acid when and where it is needed. There are problems with these methods. Although emulsified acids are popular and effective, they require additional additives and specialized equipment and expertise, and may be difficult to control. A problem with the encapsulated acids is that the location and timing of release of the acid may be difficult to control. The release is brought about by either physical or chemical degradation of the coating. Physical damage to the encapsulating material, or incomplete or inadequate coating during manufacture, could cause premature release of the acid.

A second method is to delay formation of the acid. Templeton, et al., in "Higher pH Acid Stimulation Systems", SPE paper 7892, 1979, described the hydrolysis of esters such as methyl formate and methyl acetate as in situ acid generators in the oilfield. They also described the reaction of ammonium monochloroacetic acid with water to generate glycolic acid and ammonium chloride in the oilfield. However, these acid precursors are liquids, and these reactions take place very rapidly as soon as the acid precursors contact water.

There is a need for a new method of delayed, controlled release of acids from solids in situ in acid fracturing.

SUMMARY OF INVENTION

One embodiment of the Invention is a method of acid fracturing using a solid acid-precursor for providing a controlled release of acid by hydrolysis and dissolution. The solid acid-precursor is lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. The solid acid-precursor may be mixed with a second solid that reacts with an acid, such as magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glassfor the purpose of increasing the rate of dissolution and hydrolysis of the solid acid-precursor. The second solid will be called a "solid acid-reactive material". In embodiments of the Invention, the particles of solid acid-precursors, optionally mixed with solid acid-reactive materials in the same or separate particles, are in the form of beads, ribbons, platelets, fibers or other shapes. When they are in the same particles, the solid acid-precursors may enclose the solid acid-reactive materials. The solid acid-precursor, including when it is mixed with or contains other materials, may itself be coated or encapsulated to slow or delay hydrolysis. In another embodiment, soluble liquids such as esters, diesters, anhydrides, lactones, sodium hydroxide, potassium hydroxide, amides, amines, carbonates, bicarbonates, alcohols, alkanol amines, ammonium hydroxide and mixtures thereof are added to the fracture fluid to accelerate the hydrolysis of the solid acid-precursor. In another embodiment, the fluid further contains a proppant. In yet another embodiment the fluid further contains a viscosifier. In a still further embodiment the fluid further contains a proppant and a viscosifier. In a further embodiment the fluid contains an acid, for example hydrochloric acid, hydrofluoric acid, ammonium bifluoride, formic acid, acetic acid, lactic acid, glycolic acid, an aminopolycarboxylic acid, a polyaminopolycarboxylic acid, a salt of one or more of these acids or a mixture of one or more of these acids or salts.

DETAILED DESCRIPTION

Figure 1:
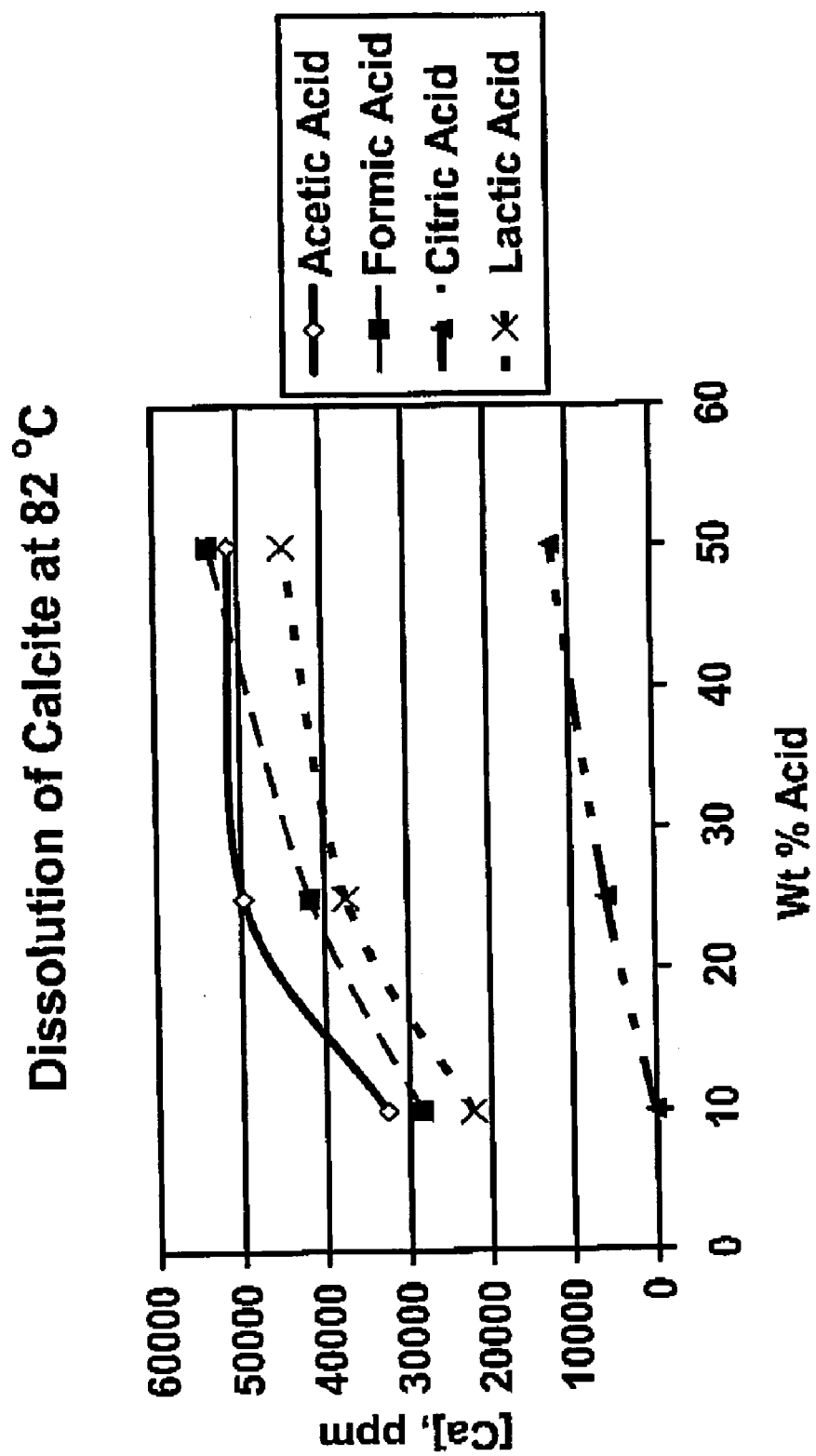
FIG. 1 shows the solubility of calcite in various organic acids.

Unlike conventional acid fracturing, the fracturing fluid used in the method of the Invention does not normally contain an acid when it is prepared at the surface and injected into the wellbore.

Excellent sources of acid that can be generated downhole when and where it is needed are solid cyclic dimers, or solid polymers, of certain organic acids, that hydrolyze under known and controllable conditions of temperature, time and pH to form the organic acids. We will call these solid materials "acid-precursors" and we will call the formation of acid downhole "delayed acid generation". One example of a suitable solid acid-precursor is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters.

Cargill Dow, Minnetonka, Minn., USA, produces the solid cyclic lactic acid dimer called "lactide" and from it produces lactic acid polymers, or polylactates, with varying molecular weights and degrees of crystallinity, under the generic trade name NATUREWORKS™PLA. The PLA's currently available from Cargill Dow have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from Cargill Dow typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the polymers dissolve very slowly in water before they hydrolyze.

Other materials suitable as solid acid-precursors are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355.

It has been found that dissolution of the solid acid-precursors of the Invention is accelerated by the addition of certain chemical agents. These agents react readily with the solid acid-precursor and cause the removal of a small amount of material from the solid acid-precursor surface. Not to be limited by theory, but it is believed that an intact surface of the solid acid-precursor is comparatively insoluble, but that when the surface is disrupted by the removal of a small amount of material subsequent dissolution of additional material from that surface is easier. Only a small amount of the accelerating agent ("accelerant") is necessary to start the dissolution process; thereafter it will proceed without any added agent. On the other hand, if there is additional agent present, since it reacts readily with the solid acid-precursor it will accelerate the continuing dissolution process. This is the "accelerant" mechanism. Note that the accelerant does not consume all of the acid generated; it causes more rapid generation of more acid by disrupting the solid acid-precursor surface structure. If the agent is a solid, it cannot accelerate the initial dissolution because there is inadequate chemical interaction between the two solids, but once the dissolution of the solid acid-precursor starts (for example as a result of an increase in temperature) the solid acid-reactive material will accelerate subsequent dissolution. Note that the formation itself can be a solid accelerant. Furthermore, the action of accelerants may be delayed, for example, if the are slowly soluble solids or if they are chemically bound in a liquid chemical that must be hydrolyzed to release the agent. One solid acid-precursor may be an accelerant for another; for example, PGA accelerates the hydrolysis of PLA. The timing and rate of dissolution of the solid acid-precursor is controlled by these techniques.

To accelerate the dissolution of solid acid-precursors, water-insoluble solid acid-soluble or acid-reactive materials, such as but not limited to magnesium hydroxide, magnesium carbonate, dolomite (magnesium calcium carbonate), calcium carbonate, aluminum hydroxide, calcium oxalate, calcium phosphate, aluminum metaphosphate, sodium zinc potassium polyphosphate glass, and sodium calcium magnesium polyphosphate glass, may be mixed with or incorporated into, solid acid-precursors, such as cyclic ester dimers of lactic acid or glycolic acid or homopolymers or copolymers of lactic acid or glycolic acid. These mixtures are added to the fracturing fluid. At least a portion of the solid acid-precursor slowly hydrolyzes at controllable rates to release acids at pre-selected locations and times in the fracture. In addition to reacting with the formation fracture face, the acids also react with and dissolve at least a portion of the acid-reactive materials, if they are present. This will accelerate the dissolution of the solid acid-precursor and generate acid in amounts beyond that which reacts with the solid acid-reactive material. The result is that at least a portion of both the solid acid-precursor and the acid-reactive solid material dissolve. Usually most or all of the solid material initially added is no longer present at the end of the treatment. However, it is not necessary either for all of the solid acid-precursor to hydrolyze or for all of the solid acid-reactive material to dissolve. Any solids remaining will beneficially act as proppant. Note that often the additional solid acid-reactive material will not be needed to accelerate the hydrolysis of the solid acid-precursor, because the formation itself will be acid-reactive. However, the solid acid-reactive material may be selected to be more reactive than the formation or may be in more intimate contact with the solid acid-precursor.

The dissolution of solid acid-precursors in acid fracturing may also be accelerated by the addition of certain soluble liquid additives. These accelerants may be acids, bases, or sources of acids or bases. These are particularly valuable at low temperatures (for example below about 135° C.), at which the solid acid-precursors hydrolyze slowly, relative to the time an operator would like to put a well on production after a fracturing treatment. Non-limiting examples of such soluble liquid additives that hydrolyze to release organic acids are esters (including cyclic esters), diesters, anhydrides, lactones and amides. A compound of this type, and the proper amount, that hydrolyzes at the appropriate rate for the temperature of the formation and the pH of the fracturing fluid is readily identified for a given treatment by simple laboratory hydrolysis experiments. Other suitable soluble liquid additives are simple bases. (They are termed "liquids" because in practice it would be simpler and safer to add them to the fracturing fluid as aqueous solutions rather than as solids.) Suitable bases are sodium hydroxide, potassium hydroxide, and ammonium hydroxide. Other suitable soluble liquid additives are alkoxides, water-soluble carbonates and bicarbonates, alcohols such as but not limited to methanol and ethanol, alkanol amines and organic amines such monoethanol amine and methyl amine. Other suitable soluble liquid additives are acids, such as but not limited to hydrochloric acid, hydrofluoric acid, ammonium bifluoride, formic acid, acetic acid, lactic acid, glycolic acid, aminopolycarboxylic acids (such as but not limited to hydroxyethyliminodiacetic acid), polyaminopolycarboxylic acids (such as but not limited to hydroxyethylethylenediaminetriacetic acid), salts—including partial salts—of the organic acids (for example, ammonium, potassium or sodium salts), and mixtures of these acids or salts. (Ammonium bifluoride partially hydrolyzes in contact with water to form some HF, and so will be called an acid here.) The organic acids may be used as their salts. When corrosive acid might contact corrodible metal, corrosion inhibitors are added.

Mixtures of one or more solid acid-precursors and one or more solid acid-reactive materials, if they are present, may be purely physical mixtures of separate particles of the separate components. The mixtures may also be manufactured such that one or more solid acid-precursors and one or more solid acid-reactive materials is in each particle; this will be termed a "combined mixture". This may be done, by non-limiting examples, by coating the acid-reactive material with the solid acid-precursor, or by heating a physical mixture until the solid acid-precursor melts, mixing thoroughly, cooling, and comminuting. For example, it is common practice in industry to co-extrude polymers with mineral filler materials, such as talc or carbonates, so that they have altered optical, thermal and/or mechanical properties. Such mixtures of polymers and solids are commonly referred to as "filled polymers". In any case it is preferable for the distribution of the components in the mixtures to be as uniform as possible. The choices and relative amounts of the components may be adjusted for the situation to control the solid acid-precursor hydrolysis rate. The most important factors will be the temperature at which the treatment will be carried out, the composition of the aqueous fluid or fluids with which the mixture will come into contact, and the time and rate desired for generation of the acid.

The solid acid-precursors or the mixtures of solid acid-precursors and solid acid-reactive materials may be manufactured in various solid shapes, including, but not limited to fibers, beads, films, ribbons and platelets. The solid acid-precursors or the mixtures of solid acid-precursors and solid acid-reactive materials may be coated to slow the hydrolysis. Suitable coatings include polycaprolate (a copolymer of glycolide and epsilon-caprolactone), and calcium stearate, both of which are hydrophobic. Polycaprolate itself slowly hydrolyzes. Generating a hydrophobic layer on the surface of the solid acid-precursors or the mixtures of solid acid-precursors and solid acid-reactive materials by any means delays the hydrolysis. Note that coating here may refer to encapsulation or simply to changing the surface by chemical reaction or by forming or adding a thin film of another material. Another suitable method of delaying the hydrolysis of the solid acid-precursor, and the release of acid, is to suspend the solid acid-precursor, optionally with a hydrophobic coating, in an oil or in the oil phase of an emulsion. The hydrolysis and acid release do not occur until water contacts the solid acid-precursor. Methods used to delay acid generation may be used in conjunction with inclusion of solid acid-reactive material to accelerate acid generation because it may be desirable to delay acid generation but then to have acid generated rapidly.

An advantage of the composition and method embodiments of the Invention is that, for a given oilfield treatment, the appropriate solid acid-precursor and solid acid-reactive material may be selected readily from among many available materials. The rate of acid generation from a particular solid acid-precursor or a particular mixture of a solid acid-precursor and a solid acid-reactive material, having a particular chemical and physical make-up, including a coating if present, at a particular temperature and in contact with a fluid or fluids of a particular composition (for example pH and the concentration and nature of other components, especially electrolytes), is readily determined by a simple experiment: exposing the acid-precursor to the fluid or fluids under treatment conditions and monitoring the release of acid. The rate of solid acid-reactive material dissolution, if the solid acid-reactive material is included, is governed by similar factors (such as by the choice of solid acid-reactive material, the ratio of materials, the particle size, calcining and coating of solid acid-reactive material) and may readily and easily be determined by similar experiments. Naturally, a solid acid-precursor is selected that a) generates acid at the desired rate (after a suitable delay if needed) and b) is compatible with and does not interfere with the function of other components of the fluid. An acid-reactive material is selected that accelerates acid generation to a suitable extent and is compatible with the function of other components of the fluid.

The solid acid-precursor particles, or the mixture particles, self-destruct in situ, that is, in the location where they are placed (deliberately or inadvertently). That location may be part of a suspension in a treatment fluid in the wellbore, in the perforations, in a fracture, as a component of a filter cake on the walls of a wellbore or of a fracture, or in the pores of the formation itself. The method may be used in carbonates and sandstones. In use, even though the particles are intended to be in a fracture, they may end up in other places, where they are normally undesirable because they impede fluid flow, so in all locations self-destruction is desired. The great majority of the particles end up in a fracture where the acid that is generated etches the fracture faces.

If a mixture is used, the particle sizes of the individual components of the mixture may be the same or different. Almost any particle size may be used. Governing factors include a) the capability of equipment, b) the width of the fracture generated, and c) the desired rate and time of self-destruction. The rate of self-destruction can readily be measured in the laboratory in a given fluid at a given temperature. Preferred sizes are those of proppants and fluid loss additives since operators have the equipment and experience suitable for those sizes.

A particular advantage of these materials is that the solid acid-precursors and the generated acids are non-toxic and are biodegradable. The solid acid-precursors are often used as self-dissolving sutures.

The solid acid-precursors of the current Invention may be used for delayed acid generation in acid fracturing in the ways in which the encapsulated acids described in U.S. Pat. No. 6,207,620, hereby incorporated in its entirety, are used.

The solid acid-precursors, with or without accelerants, may be used particularly effectively in acid fracturing treatments. Acid fracturing is a process in which an acidic fluid is injected into a formation at a pressure sufficiently high to fracture the rock; the acid then etches the surfaces of the fracture so that conductive flow paths are formed, along the fracture faces, that remain after the pressure is released and the fracture faces are forced back together. There are potentially serious problems encountered with acid fracturing. First, acids, especially strong acids, react with the first material they encounter. In an acid fracturing treatment, as in matrix acidizing treatments, this means that as soon as a fracture forms or is enlarged, or as soon as a high permeability region is formed or encountered, both of which are likely to occur near the wellbore, acid will contact the fresh matrix surface near the wellbore, or in fluid contact with the high permeability region near the wellbore, and react with it. Most or all of the acid reaction then occurs near the wellbore, or in or near the high permeability region near the wellbore, and little or none of the acid reaches portions of the fracture farther from the wellbore, or farther away than the high permeability region. Therefore etched flow paths along the fracture faces are not formed very far away from the wellbore or beyond any high permeability regions. Second, once the acid begins to react with a portion of the matrix material, it tends to form "wormholes" or paths of least resistance that subsequent acid will follow. If either or both of these occurs, then when the pressure is released and the fracture closes, a satisfactory flow path for production of fluids, from the formation into the fracture and then into the wellbore, will not be formed. Solid acid-precursors solve these problems. Because the fluid is not sufficiently acidic when it is first injected, it will not react with the first formation material with which it comes into contact; rather it will be carried farther into the growing fracture where the acid will subsequently react when it is released. Also, because the acid-precursor is a solid material, if it is large it will help prop open the fracture until the differential etching occurs, but then after it is hydrolyzed the solid acid-precursor will no longer be present and so if it is small it will not impede fluid flow from the formation into the wellbore for production.

Thus one embodiment of the Invention is a method of acid fracturing with a solid acid-precursor present in the fracturing fluid. This may be done in several ways. The solid acid-precursor is sometimes included in an otherwise conventional acid fracturing treatment (in which the fluid contains an acid such as HCl, HF, an organic acid or mixtures thereof). The initially present acids will tend to spend in the near-wellbore or high permeability region of the formation, but the solid acid-precursor will be carried farther into the fracture and generate acid in situ that will etch the fracture faces farther from the wellbore. Most commonly, the solid acid-precursor is the only source of acid in the treatment. Optionally, in an acid fracturing treatment in which the acid is generated from a solid acid-precursor, proppant may be included to help keep the fracture open until the solid acid-precursor has hydrolyzed and dissolved.

In acid fracturing, large amounts of solid acid-precursor are typically desirable. Rapid dissolution of the solid acid-precursor is typically desirable (as long as too much dissolution does not occur too close to the wellbore) because if the particles dissolve too slowly then even dissolution of the formation rather than differential etching of fracture faces may result. Corrosion inhibitor should be added in case particles are trapped, before they reach the fracture, in a place where their dissolution will generate an acid that will contact metal components. An appropriate amount of buffer may be added to the fluid or to the particles to counteract the effects of acid being generated by premature hydrolysis of the solid acid-precursor.

In an important embodiment, the solid acid-precursor (with or without any additional solid acid-reactive material) is used in a fracturing treatment in which it is the only source of acid; it also acts as a proppant until it hydrolyzes. (Normally proppant is not used in acid fracturing, although it can be and such use would be within the scope of the Invention.) The solid acid-precursor is pumped into the well and at temperature, hydrolyses to the active acid, and reacts with the surface of the rock. Such treatments are conducted as cost-minimization water fracs in which a low concentration, for example about 0.05 kg/L, of solid acid-precursor or mixture is pumped at a high rate, for example up to about 3500 L/min or more, with little or no viscosifier. They are also conducted, as are more conventional fracturing treatments, with viscosifiers and higher concentrations, for example up to about 0.6 kg/L, of solid acid-precursor or mixture. The viscosifiers are the polymers or viscoelastic surfactants typically used in fracturing, frac-packing and gravel packing. In this case the solid acid-precursor or mixture acts as a proppant and is preferably in the form of beads in the size range typically used for proppants in hydraulic fracturing. When a large amount of particles of solid acid-precursor or mixture is used, this may necessitate using a more viscous fluid than is usually used in conventional acid fracturing. The lower density of the solid acid-precursor or mixture, relative to the density of conventional proppants, is an advantage since the amount of viscosifier needed is less. The solid acid-precursor or mixture also acts as a breaker for the viscosifier, thus enhancing cleanup and offsetting any damage that might be done by the viscosifier. (Acids are known to damage or destroy synthetic polymers and biopolymers used to viscosify drilling, completion and stimulation fluids. Acids are also known to damage or destroy either the micelle/vesicle structures formed by viscoelastic surfactants or, in some cases, the surfactants themselves.) In another embodiment, at least a portion of the solid acid-precursor or mixture is in the form of fibers. Fibers are known to assist in the transport of more spherical particles, reducing or eliminating the need for viscosification.

The amount of solid acid-precursor or mixture used per unit area of fracture to be created, depends upon, among other factors, the temperature and the amount of acid needed. The preferred concentration range is between about 0.42 and about 5 ppg (between about 0.05 and about 0.6 kg/L). The most preferred range is between about 0.83 and about 2.5 ppg (between about 0.1 and about 0.3 kg/L).

Although one of the principle benefits of the method of the Invention is that little or no diversion is required to divert acid from wormholes or high permeability regions being created during the treatment, diverters may still be used to divert the fluid containing a solid acid-reactive material from already-present high permeability streaks, vugs, or natural fractures.

In addition to etching fracture faces to increase fracture conductivity, acid generated from solid acid-precursors serves a number of other useful functions, for example as a breaker or breaker aid for polymer or viscoelastic surfactant thickeners if they are present, as a dissolver of fluid loss additives, or as a dissolver of scales or fines, etc.

There are a number of particle shapes that are used in the Invention. In the simplest embodiment, sized particles, beads, fibers, platelets or ribbons (or other shapes) of solid acid-precursor are used. It is also within the scope of the Invention to manufacture particles that contain both the solid acid-precursor and the acid-soluble particulate material, for example to co-extrude mixtures of calcium carbonate and solid acid-precursor in particles, fibers, platelets or ribbons that are used for this function. Calcium carbonate (or other solid acid-reactive materials) coated with solid acid-precursor may also be used. The concentration of particles in the fracture or the tightness of the packing of the particles in the fracture may also be used to control the rates of generation of acid and dissolution of particles by affecting local concentrations of reactants and products, convection, and other factors. It is also within the scope of the Invention to manufacture particles that contain both the solid acid-precursor and an acid-soluble particulate material, for example to co-extrude (and optionally then to comminute) mixtures of solid acid-reactive material and solid acid-precursor in particles, fibers, platelets, ribbons or other shapes. Calcium carbonate or other solid acid-reactive material coated with solid acid-precursor may also be used.

When solid acid-precursors or mixtures of solid acid-precursors and solid acid-reactive materials are used in acid fracturing, with or without soluble accelerants, the solid acid-precursor or mixture of solid acid-precursor and solid acid-reactive material are initially inert to any other components of the fluids, so the other fluids may be prepared and used in the usual way. Any additives used in oilfield treatment fluids may also be included provided that they are compatible with, and do not interfere with the performance of, the solid acid-precursor and/or the solid acid-reactive material and/or soluble liquid accelerants, if the are used, and vice versa. If the fluid contains a component (such as a buffer or a viscosifier) that would affect or be affected by the solid acid-precursor or mixture of solid acid-precursor and solid acid-reactive material or soluble liquid accelerant, then either the amount or nature of the solid acid-precursor or mixture of solid acid-precursor and solid acid-reactive material or soluble liquid accelerant, or the amount or nature of the interfering or interfered-with component may be adjusted to compensate for the interaction. This may readily be determined by simple laboratory experiments.

Although the compositions and method embodiments of the Invention are described in terms of producing wells for oil and/or gas, the compositions and methods have other uses, for example they may also be used in injection wells (such as for enhanced recovery or for storage or disposal) or in production wells for other fluids such as carbon dioxide or water.

EXAMPLE 1

Lactic acid is not as commonly used as an acid in oilfield treatments as are formic, acetic and citric acids. Tests were run to determine the capacity of lactic acid in the dissolution of calcite at 82° C. FIG. 1 shows the concentration of calcite in ppm (measured as $Ca^{++}$ by ICP-AES) dissolved by reagent grade lactic acid as a function of weight percent acid in water. Lactic acid has a capacity for dissolving calcite that is similar to acetic acid or formic acid, and much higher than citric acid. These tests demonstrate that lactic acid generated from a lactate polymer is effective for dissolution of calcium carbonate.

EXAMPLE 2

Experiments were performed (Table 1) to evaluate the hydrolysis rate of PLA and to compare the hydrolysis rates of PLA with and without added calcite. The PLA was OLE_LINK3NATUREWORKS™PLA Polylactide Resin 4042DOLE_LINK3, a polymerized mixture of D- and L-lactic acid, available from Cargill Dow, Minnetonka, Minn., USA. The material was used as approximately 4 mm diameter beads. The calcite was reagent grade powder. 45.04 Grams PLA and 20 grams calcite, when used, were added to 500 ml distilled water. The time shown is the time for 100% hydrolysis.

TABLE 1

| Composition | 121° C. | 135° C. | 149° C. |
| --- | --- | --- | --- |
| PLA | Dissolves in greater than 2 hours | Dissolves in greater than 2 hours | Dissolves in less than 2 hours |
| PLA + Calcite | Dissolves in greater than 2 hours 30 minutes | Dissolves in less than 2 hours 30 minutes | Dissolves in less than 45 minutes |
| Calcite | Insoluble | Insoluble | Insoluble |

In another experiment, a sample of a biaxially stretched PLA film (about 0.02 mm thick and cut into pieces about 25 mm by about 25 mm) obtained as NATUREWORKS™ BOPLA Biaxially Oriented Poly Lactic Acid Film MLF 100 from Cargill Dow, Minnetonka, Minn., USA, was found to be approximately as readily dissolved in distilled water at 149° C. as was the NATUREWORKS™PLA Polylactide Resin 4042D. These results show that these solid acid-precursors hydrolyze and dissolve at a rate suitable for use as an acid source in acid fracturing and that they dissolve calcite. Furthermore, calcite, which is insoluble in water under these conditions, accelerates the rate of PLA hydrolysis.

EXAMPLE 3

Experiments were conducted to demonstrate the efficacy of soluble liquid accelerants. 45.04 Grams NATUREWORKS™ PLA Polylactide Resin 4042D was added to 500 ml distilled water. This would be 1 molar lactic acid if fully hydrolyzed. Varying amounts of accelerant, giving concentrations ranging from about 0.1 molar to about 1 molar were added. The mixture was then stirred at 90° C. After X hours, complete hydrolysis was not observed. Sodium hydroxide was found to be approximately as reactive as propylene glycol diacetate; those two were more reactive than potassium hydroxide, which was more reactive than ammonium hydroxide. Once the PLA dissolution was initiated, the rate was not affected by the concentration of added component.

The invention claimed is:

1. A method of acid fracturing a subterranean formation penetrated by a wellbore comprising:
    a) injecting into the formation a fluid comprising particles of a solid acid-precursor at a concentration between about 0.05 and about 0.6 kg/L, at a pressure sufficient to fracture the formation, said fluid not viscosified with a viscoelastic surfactant, and
    b) allowing at least a portion of the solid acid-precursor to hydrolyze,
wherein the solid acid-precursor is mixed with a solid acid-reactive material selected from the group consisting of magnesium hydroxide, magnesium carbonate, magnesium calcium carbonate, calcium carbonate, aluminum hydroxide, calcium oxalate, calcium phosphate, aluminum metaphosphate, sodium zinc potassium polyphosphate glass, and sodium calcium magnesium polyphosphate glass.

2. The method of claim 1 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

3. The method of claim 2 wherein the solid acid-precursor is polylactic acid.

4. The method of claim 1 wherein particles of the solid acid-precursor are physically mixed with particles of the solid acid-reactive material.

5. The method of claim 1 wherein the solid acid-precursor is in the same particle as the solid acid-reactive material.

6. The method of claim 5 wherein the solid acid-reactive material is surrounded by the solid acid-precursor.

7. The method of claim 6 wherein the solid acid-precursor surrounding the solid acid-reactive material is coated with a hydrolysis-delaying material.

8. A method of acid fracturing a subterranean formation penetrated by a wellbore comprising:
    a) injecting into the formation a fluid comprising particles of a solid acid-precursor at a concentration between about 0.05 and about 0.6 kg/L, at a pressure sufficient to fracture the formation, said fluid not viscosified with a viscoelastic surfactant, and
    b) allowing at least a portion of the solid acid-precursor to hydrolyze, wherein the solid acid-precursor is coated with a hydrolysis-delaying material.

9. The method of claim 8 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

10. The method of claim 9 wherein the solid acid-precursor is polylactic acid.

11. A method of acid fracturing a subterranean formation penetrated by a wellbore comprising:
    a) injecting into the formation a fluid comprising particles of a solid acid-precursor at a concentration between about 0.05 and about 0.6 kg/L, at a pressure sufficient to fracture the formation, said fluid not viscosified with a viscoelastic surfactant, and
    b) allowing at least a portion of the solid acid-precursor to hydrolyze, wherein the fluid further comprises a water-soluble agent that accelerates hydrolysis of the solid acid-precursor, said agent selected from the group consisting of esters, diesters, anhydrides, lactones, alkali metal alkoxides, carbonates, bicarbonates, alcohols, alkali metal hydroxides, ammonium hydroxide, amides, amines, alkanol amines and mixtures thereof.

12. The method of claim 11 wherein the agent is selected from the group consisting of sodium hydroxide, potassium hydroxide, ammonium hydroxide and propylene glycol diacetate.

13. The method of claim 11 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

14. The method of claim 13 wherein the solid acid-precursor is polylactic acid.

15. A method of acid fracturing a subterranean formation penetrated by a wellbore comprising:
    a) injecting into the formation a fluid comprising particles of a solid acid-precursor at a concentration between about 0.05 and about 0.6 kg/L, at a pressure sufficient to fracture the formation, said fluid not viscosified with a viscoelastic surfactant, and
    b) allowing at least a portion of the solid acid-precursor to hydrolyze, wherein the fluid further comprises an acid selected from the group consisting of hydrochloric acid, hydrofluoric acid, ammonium bifluoride, formic acid, acetic acid, lactic acid, glycolic acid, aminopolycarboxylic acids, polyaminopolycarboxylic acids, salts thereof and mixtures thereof.

16. The method of claim 15 wherein the solid acid-precursor is selected from the group consisting of lactide, glycolide, polylactic acid, polyglycolic acid, copolymers of polylactic acid and polyglycolic acid, copolymers of glycolic acid with other hydroxy-, carboxylic acid-, or hydroxycarboxylic acid-containing moieties, copolymers of lactic acid with other hydroxy-, carboxylic acid-, or hydroxycarboxylic acid-containing moieties, and mixtures thereof.

17. The method of claim 16 wherein the solid acid-precursor is polylactic acid.

* * * * *